MATRIX CASE

Filed Feb. 25, 1960

INVENTOR
ARTUR ROTH

BY Cushman, Darby & Cushman
ATTORNEYS 3,109,536

MATRIX CASE

Artur Roth, Philadelphia, Pa., assignor to Lanston Industries, Incorporated, Philadelphia, Pa., a corporation of Virginia Filed Feb. 25, 1960, Ser. No. 11,058
9 Claims. (Cl. 199—79)

Figure 1:
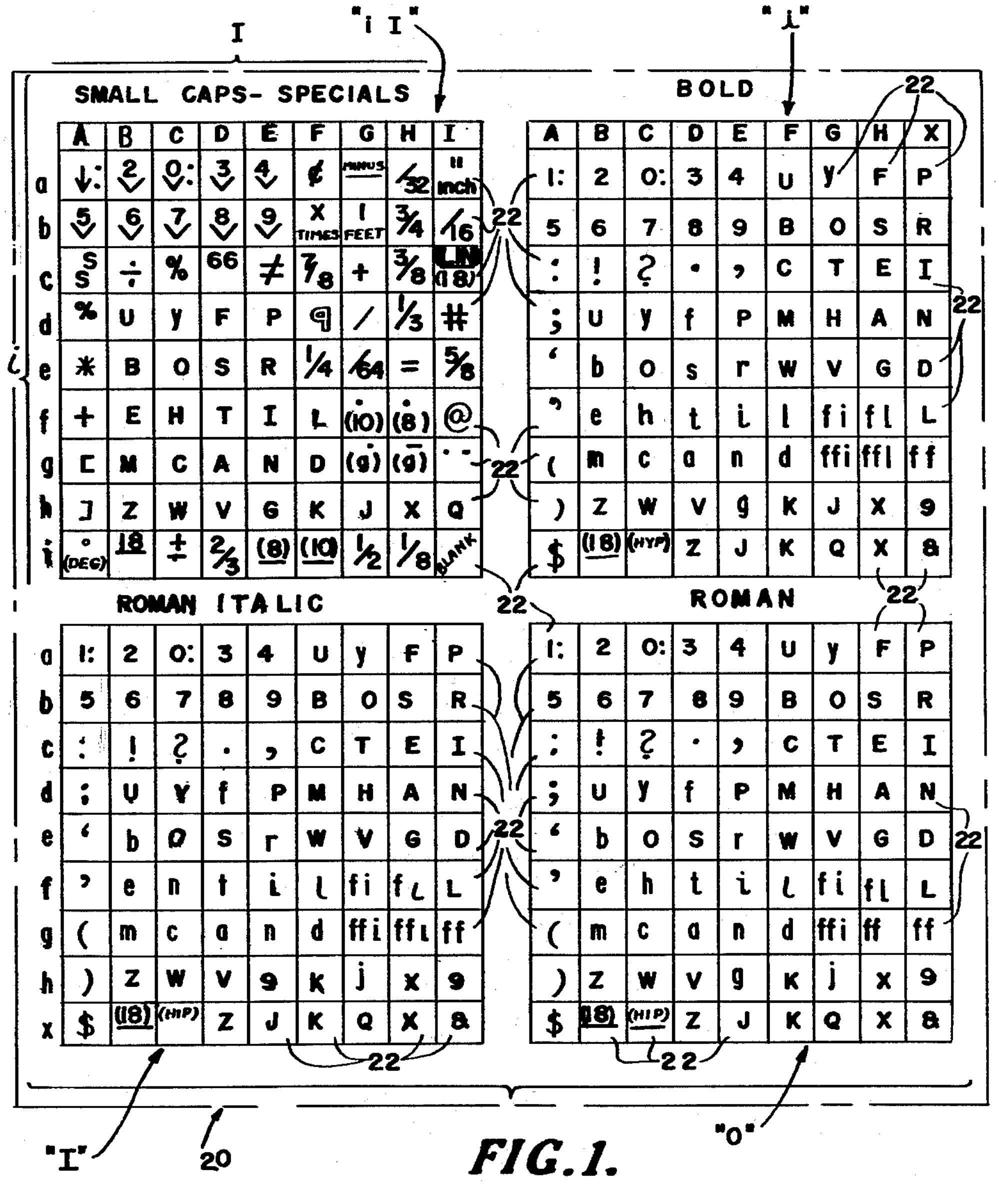

The present invention relates to matrix cases of the type adapted to be used in a type casting machine such as that disclosed in Patent No. 2,883,038. More specifically, the present invention relates to arrangements of the matrices in the matrix case.

In type casting machines of the type disclosed in the patent referred to above, the dimensioning or sizing of the individual characters being cast is effected independently of the positioning of the individual matrices in molding position.

It is an object of the invention to provide a novel arrangement of character bearing matrices in a matrix case wherein the matrices are arranged in rows and columns without regard to the set size or width of the characters represented by the matrix. The matrices are arranged according to frequency of use so that the most frequently used matrices will be in positions requiring minimum movements of the matrix case to position such characters in molding position over the mold in type casting machines.

According to a more specific object of the invention, the arrangement of matrices is specifically designed to adapt the matrix case to be utilized in an 18 x 18 system of type composing and casting, such as is described in the patent referred to above and in the copending application entitled "Type Composing Machine." The matrix case preferably is divided into a plurality of sections or quadrants, and the individual matrices are arranged in rows and columns in each section or quadrant without regard to the width or set size of the characters represented by the matrices. In the illustrative embodiment of the invention, to be described in more detail hereinbelow, there are provided four such sections arranged in the matrix case so as to define a quadrangular outline. Each section includes nine rows and nine columns, and at least some of said sections include a partial font. As is understood, and as defined in the book entitled "The Monotype System" published by the Lanston Monotype Company, Philadelphia, 1916, a partial font consists of caps, lower case, figures, and points, from 72 to 82 characters, depending on whether ligatures are supplied. A few partial fonts consist only of caps, points, and figures, about 46 characters; or small caps only, 27 characters.

Further objects and advantages of the invention will be in part obvious and in part pointed out hereinafter.

The novel features of the invention may be best made clear from the following description and accompanying drawing wherein there is shown schematically an exemplary arrangement of matrices embodying the invention, and with the matrix case mounting these matrices being shown in phantom lines.

There is shown in the drawing a matrix case identified by numeral 20, and a plurality of matrices 22 arranged therein. The construction of the matrix case 20 and matrices 22, and the manner in which the individual matrices are mounted or held in the matrix case are not a part of the present invention. Any suitable matrix case construction, and any suitable means for mounting or securing the individual matrices in the matrix case may be utilized, such as is disclosed, for example, in the book "The Monotype System" referred to above, and in Patent No. 625,998, and the disclosures thereof are incorporated herein by reference for that purpose.

In the illustrative embodiment of the invention, the matrices 22 are arranged in rows and columns in individual sections or quadrants identified as "O," "i," "I," and "iI." There are nine rows and nine columns in each of these quadrants and the quadrants are arranged so as to define a square of 18 horizontal rows and 18 vertical columns. The columns in the "iI" and "I" quadrants are identified by the letters "A" through "I" shown thereabove in the drawing, and the columns in the "i" and "O" quadrants by the letters "A" through "H" and "X," also shown thereabove in the drawing. The rows of matrices for the "iI" and "i" quadrants are identified by the letters "a" through "i" shown to the left thereof in the drawing, and the rows in the "I" through "O" quadrants are identified by the letters "a" through "h" and "x," also shown to the left thereof in the drawing.

According to the invention, the character bearing matrices in each of these quadrants are arranged not according to the width or set size of the characters in question, but according to their frequency of occurrence or use, whereby the type composing and casting operations will be rendered more efficient, as will be understood. In conventional matrix cases, such as a 15 x 15 matrix case, the characters are arranged in rows and columns according to their widths, whereby all characters of a given width are arranged in one column, and characters of other widths are likewise arranged in other columns according to their width. Thus, in a 15 x 15 matrix case, there are fifteen rows and fifteen columns, each column representing a different width and the characters represented by all of the matrices in each column being of the same width. Such an arrangement of characters in the matrix case imposed limitations on the operation of the casting machine, since the character bearing matrices could not be arranged in the matrix case according to the frequency of use thereof, as is understood. However, in matrix cases embodying the invention, the matrices in any column or row may represent characters of different width or set size since the matrices are arranged according to the frequency of occurrence or use of the characters represented thereby in the composition or material to be printed.

The identifying letters for the quadrants and the rows and columns therein correspond to positioning signals that will be transmitted in the casting machine for effecting positioning of the proper character bearing matrix in casting position over the mold, in the exemplary 18 x 18 system of type casting and composing referred to above, except that there will be no positioning signal for indicating either the column "X" or the row "x," these being indicated by a fixed stop pin in the casting machine, as will be understood. Thus, any character in the "iI" quadrant will have an "i" positioning signal and an "I" positioning signal and an additional positioning signal or signals from the "A–H" and "a–h" groups to effect location thereof in molding position. Likewise, any character in the "i" quadrant will be represented by an "i" positioning signal and another positioning signal or signals depending on the row and column in which it is located. The characters in the "I" quadrant will be represented by an "I" positioning signal and another positioning signal or signals corresponding to the row and column in which they are located. It will be noted that the characters in the "X" column in the "i" quadrant will not have any positioning signal to designate such column, since this column is designated by a stop pin, as referred to above, and any characters in the "x" row in the "I" quadrant likewise will not have any positioning signal to represent that row, since this row is represented by a fixed pin in the casting machine, as discussed above. Thus, there will only be an "i" positioning signal for the character in the lower right hand corner of the "i" quadrant, and only an "I" positioning signal for the character in the lower right hand corner of the "I" quadrant. And, there will only be an "i" positioning signal and an "I" positioning signal for the character in the lower right hand corner of the "iI" quadrant.

All of the characters in the "O" quadrant will only have positioning signals corresponding to the rows and columns in which they are located. There will be no need for a separate "O" positioning signal to move the matrices in the "O" quadrant over the mold, as will be understood. So long as neither the "i" nor the "I" positioning signals are present, the matrix case will be moved in the type casting machine to the "O" quadrant, and the matrices therein will be located in molding position by the positioning signals corresponding to their rows and columns, except that, as mentioned above, there is no need for any positioning signal for the characters in the "x" row and the "X" column. Thus, there will be no positioning signals necessary for the matrix in the lower right hand corner of the "O" quadrant.

As shown in the drawing, each of the quadrants "i", "I" and "O" includes an arrangement of characters constituting a partial font, the "i" quadrant representing bold face, the "I" quadrant representing roman italic, and the "O" quadrant representing roman. Ligatures are also arranged in these quadrants, as shown in the "iI" quadrant, there is an arrangement of small caps and specials, as shown.

As will be appreciated, the present invention provides for arrangements of matrices capable of increasing the versatility, scope and efficiency of type composing and casting operations. The specific arrangement illustrated and described herein has been found to be most advantageous in connection with the 18 x 18 system of type composing and casting, as referred to above.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. A matrix case of the kind movable as a unit in a type casting machine to determine the character of the type being cast as a result of the position of movement thereof comprising a plurality of sections mounted for movement together as a unit, a plurality of character representing matrices having means thereon for forming the characters of the type being cast, said matrices being arranged in each section in rows and columns and with indifference to the set size or width of the characters represented by the matrices, the matrices of at least two sections each constituting a substantially complete font.

2. The matrix case defined in claim 1 wherein there are four of said sections and said sections all comprise the same number of rows and columns.

3. The matrix case defined in claim 2 wherein said sections are arranged so as to define a quadrangular outline.

4. The matrix case defined in claim 3 wherein there are nine rows and nine columns in each of said sections.

5. The matrix case defined in claim 1 wherein the fonts of said sections include matrices representing distinct corresponding characters.

6. The matrix case defined in claim 5 wherein the matrices of said fonts are arranged with the corresponding characters represented thereby in corresponding positions within the rows and columns of the sections.

7. A matrix case comprising a multiplicity of character representing matrices mounted together for movement as a unit into a multiplicity of different operative positions corresponding in number to the number of matrices, said matrices being arranged in rows and columns of substantially equal number, said matrices representing characters defining at least two distinct substantially complete fonts, the matrices defining each font being grouped together to define a section in the row and column arrangement.

8. A matrix case comprising a multiplicity of character representing matrices mounted together for movement as a unit into a multiplicity of different operative positions corresponding in number to the number of matrices, said matrices being arranged in rows and columns of equal number and grouped in four quadrants, the matrices in three of said four quadrants each representing characters defining a substantially complete font, said fonts being distinct from each other and including corresponding characters, the matrices of said fonts being arranged within the associated quadrants with corresponding characters represented thereby in corresponding positions within the quadrant.

9. A matrix case comprising a multiplicity of character representing matrices mounted together for movement as a unit into a multiplicity of different operative positions corresponding in number to the number of matrices, said matrices being arranged in rows and columns of equal number and grouped in four quadrants, the matrices in three of said four quadrants each representing characters defining a substantially complete font, said fonts being distinct from each other and including corresponding characters, the matrices of said fonts being arranged within the associated quadrants with indifference to the set size or width of the characters represented thereby and with corresponding characters represented thereby in corresponding positions within the quadrant.

References Cited in the file of this patent

UNITED STATES PATENTS

| | | |
|---|---|---|
| 606,903 | Torrey | July 5, 1898 |
| 706,002 | Allen | Aug. 5, 1902 |
| 707,548 | Campbell | Aug. 26, 1902 |
| 794,851 | Campbell | July 18, 1905 |
| 760,876 | Lord | July 23, 1907 |
| 1,112,886 | Bellows | Oct. 6, 1914 |
| 2,261,965 | Colton | Nov. 11, 1941 |